Oct. 16, 1956  E. C. CHAPMAN ET AL  2,767,290
INDUCTION FUSION WELDING OF METAL MEMBERS
Filed July 1, 1954
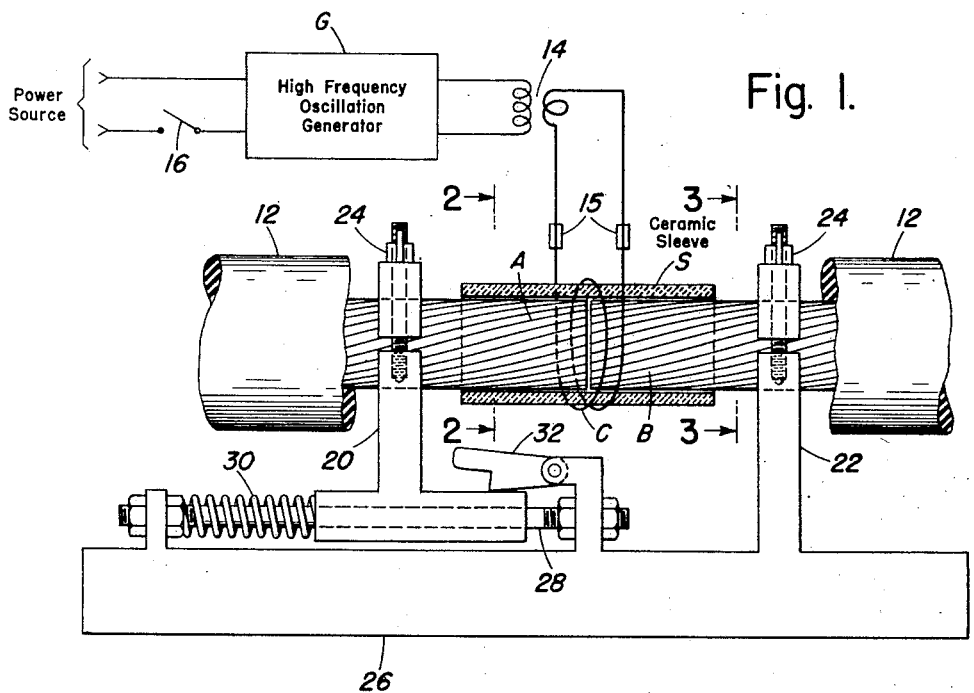
Fig. 1.
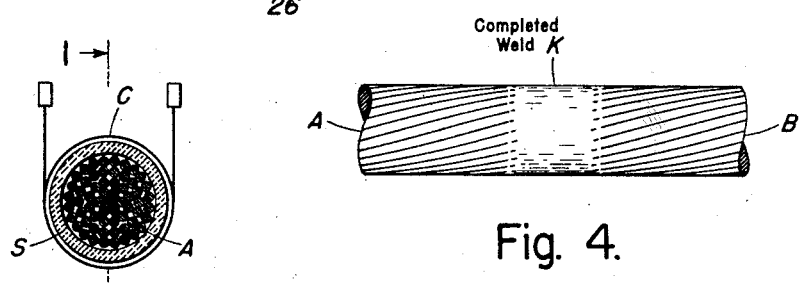
Fig. 4.
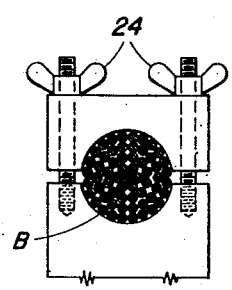
Fig. 2.
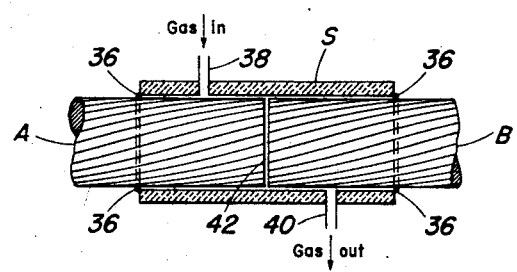
Fig. 5.
Fig. 3.
INVENTORS
Edward Corbin Chapman
James A. Bryan, Jr.
BY  *R. H. Bryant*
ATTORNEY

United States Patent Office 2,767,290
Patented Oct. 16, 1956

2,767,290

INDUCTION FUSION WELDING OF METAL MEMBERS

Edward C. Chapman and James A. Bryan, Jr., Chattanooga, Tenn., assignors to Combustion Engineering, Inc., New York, N. Y., a corporation of Delaware Application July 1, 1954, Serial No. 440,830

4 Claims. (Cl. 219—9.5)

This invention relates to welding metal members by the aid of electrical energy inductively transmitted thereto, and it has special utility in connection with fusion welding the ends of copper cable or other metal members through employment of high frequency electrical induction to heat the metal ends to welding temperature.

Considering multi-strand copper cable as an illustrative example, past efforts to weld or otherwise join the ends of such cable have resulted in junctures which are of larger diameter than the cable itself or which have been found deficient due either to excessive cost or to inferior quality of the joint.

An object of the present invention is to provide a juncture whose diameter is no greater than that of the cable ends or other metal members being joined and which is low in cost and high in quality.

Another object is to assure a juncture in which the fused metal has the same composition as the original cable and in which the electrical conductivity is not objectionably reduced at the weld.

A further object is to provide a technique which permits satisfactory welding of members whose abutting ends are relatively ragged and not accurately faced.

A still further object is to accomplish the foregoing by the aid of apparatus which is simple in construction and reliable in operation.

Other objects and advantages will become apparent as the disclosure and description hereof proceeds. Illustrative embodiments of the invention are shown in the accompanying drawings wherein:

Fig. 1 is a cross section, taken on line 1—1 of Fig. 2, showing the approximate position of the induction coil and the cooperating ceramic sleeve with respect to the two cable ends to be welded and also showing clamp means for engaging those two cable ends and for pressing same together inside the ceramic sleeve.

Fig. 2 is a sectional elevation on line 2—2 of Fig. 1 showing the generally concentric relationship of the cable, the ceramic sleeve and the induction coil.

Fig. 3 is a section on line 3—3 of Fig. 1 showing the removable clamp with which each of the two support blocks is equipped.

Fig. 4 indicates how the cable ends appear after same have been welded together by the new technique of this invention.

Fig. 5 shows provision for introducing a protective gas atmosphere which may be either inert or non-oxidizing depending on the particular requirements of the metal being welded.

The improvements of this invention are usable to join metal members of a wide variety of shapes and compositions and they therefore are not restricted solely to the fusion welding of multi-strand copper cable as here shown by way of illustration; instead, they may also find utility in the welding of solid copper cable and of solid or multi-strand cable of metals other than copper, as well as various other metal members whose cross section is not only circular but also of other shape such as square or rectangular.

In the drawing views hereof, the ends A and B of two metal cable lengths that are to be welded together are inserted into opposite ends of a ceramic sleeve S, so as to meet generally midway of the sleeve in the abutting relationship indicated. Each of the cable lengths here illustrated is made up of a plurality of individual strands packed together as shown by Figs. 2 and 3 and twisted as shown by Figs. 1 and 4, and it is represented as being covered with insulation 12, except for the extreme end portion from which this insulation has been stripped.

The ceramic sleeve S is dimensioned to encircle cable ends A and B with snugness which, while relatively close, does not interfere with a free sliding of the ends into the sleeve. The material of the sleeve is chosen to withstand the high metal temperatures encountered during welding. Another essential property is that the material permit unobstructed flow therethrough of magnetic lines of force set up by an inductor heating coil C which surrounds the sleeve in the region where the two cable ends meet. A further desirable property is a brittleness or other quality that permits the sleeve readily to be broken from around the cable ends after welding thereof has been accomplished. One material for sleeve S, which meets all of these requirements, is a ceramic composition fused at high temperature and commonly used for electrical insulators, gas burner tips and the like.

The mentioned inductor coil C serves to transmit electrical energy that is effective to heat the end metal of the cable ends A and B which abut inside the sleeve. This coil is illustratively shown as comprising two turns of relatively heavy conductor connected via removable connectors 15 with the low voltage and high amperage secondary winding of a transformer 14. The primary winding of this transformer is energized from a high frequency oscillation generator G that is connectable with a power sourve via switch 16.

Since such generators are well known, no attempt to illustrate details is here made. Instead, it will suffice to say that upon closure of switch 16 generator G supplies transformer 14 with alternating current of a relatively high frequency typified by several thousand cycles per second (three to ten thousand may be taken as illustrative). The intensity of this heating current as transmitted by transformer 14 to inductor coil C is adjusted so as to produce the requisite heating of cable ends A and B, as will later be explained; this adjustment being accomplished at generator G in well known manner.

The schematic representation of Fig. 1 further includes clamp blocks 20 and 22 into which cable ends A and B can respectively be secured upon the tightening of wing nuts 24. Block 22 is fixedly mounted upon a base 26, which base also carries block 20 in a way permitting movement thereby along guide rod means 28 axially of the cable ends and the ceramic sleeve S. Clamp block 20 is urged to the right by a compression spring 30, while a latch 32 can either limit such movement or be lifted up (as shown in Fig. 1) to permit further travel by member 20 to the right under the compressive force of spring 30.

In utilizing the apparatus here disclosed for fusion welding the ends A and B of cable or other metal members, these ends can first have their faces cut in fairly close parallelism (although this is not imperative) and they then are respectively inserted through clamp blocks 20 and 22 and into the opposite ends of ceramic sleeve S, which sleeve in turn is surrounded by inductor coil C. But before this is done, clamp block 20 has been moved to the left against compression spring 30 and there locked behind latch 32 in its downward position.

The two metal members A and B now are secured in their clamping blocks 20 and 22 via a tightening of wing nuts 24; the initial positioning being such as to leave between the member ends a short axial spacing. Latch 32 next is lifted up allowing spring 30 to move block 20 to the right until member end A abuts against stationary member end B inside ceramic sleeve S. Once this happens, spring 30 continues to press the two member ends together with a force that has been chosen (in designing the spring) to facilitate later accomplishment of a satisfactory fusion weld.

The high frequency oscillation generator G is next turned on at switch 16 causing transformer 14 to flow through coil C high frequency alternating current which is effective to heat the extreme end metal of members A and B to welding temperature. In the case of copper, such temperature may be of the order of 1975 to 2000 degrees Fahrenheit and it is accompanied by a melting and intimate fusion together of the end metal of said abutting members.

Close intimacy of said fusion is assured by the abutting force which compression spring 30 continues to exert during the welding cycle; and it is at this point that ceramic sleeve S performs the vital function of acting as a mold for restraining the melted end metal from flaring out to a diameter any greater than the inside of said sleeve S. Said melted metal from the two abutting ends thus intermingles, completely filling the space between the unmelted portions of members A and B and being restrained from outward flow by the surrounding sleeve S.

Application of the heating current is continued for a time sufficient to assure intimate admixing of the melted metal at the member end juncture. In the case of copper cable, a period of from a few seconds to one or two minutes is ordinarily found to be adequate.

At the end of this period, the heating current is cut off by opening power switch 16. This permits the melted metal quickly to cool and solidify into a mass of solid metal which is shaped like the inside of ceramic sleeve S and which unites the abutted members A and B in strong and intimate fashion. Such completed weld has the appearance shown in Fig. 4. It will be noted that the diameter of juncture K is substantially no greater than that of the cable ends A and B which have been united; moreover, the juncture metal has the same composition as the cable ends and the electrical conductivity is not objectionably reduced at the joint.

The welding setup is now disassembled. This consists of freeing inductor coil C from its power lead connectors 15 and unwrapping the turns thereof from around ceramic sleeve S; striking the frangible sleeve S a sharp hammer blow which breaks it, permitting removal from around the welded members A and B; and finally releasing (via removal of wing nuts 24) said welded members from clamp blocks 20 and 22 and withdrawing them from the apparatus.

This completes the welding cycle and places the apparatus in condition to receive two other members which are to be welded via use of a new ceramic sleeve S around which the inductor coil C is wrapped and reconnected with power leads 15.

When it is desired to weld metal members A and B having cross sections other than circular, this can be done by providing a ceramic sleeve S which is fitted to that shape. In all other respects, the welding technique and cycle will be the same as described hereinabove.

The foregoing description applies to situations wherein the metal members can satisfactorily be joined without the aid of any protective atmosphere. However, certain metals do have a high affinity for oxygen or nitrogen. One example of these is zirconium. When working with such metals, it is necessary to exclude any gases which will either combine therewith or dissolve therein and thereby have a detrimental effect upon the metal properties.

Provision for dealing with these situations is shown by Fig. 5. There the ceramic sleeve S has its two ends respectively sealed at 36 around the metal members A and B; an inlet 38 leads gas (inert or non-oxidizing) to the inside of sleeve S on one side of the abutting location 42; and an outlet 40 conveys this gas to the sleeve exterior after the gas has passed through and around the abutment region 42 and purged this region of all air or other gas of a harmful nature.

This assures complete protection for the heated and molten metal throughout the welding cycle, thereby permitting the welding of many metals which heretofore have been weldable only at great cost or by methods impractical as compared with the present one.

From the foregoing, it will be seen that the inventive improvements herein disclosed are extensive in their application and are not to be restricted to the specific form here disclosed by way of illustration.

What we claim is:

1. In apparatus for fusion welding the ends of metal members, the combination of a sleeve of breakable material such as frangible ceramic adapted to receive said member ends via insertion thereof into opposite ends of the sleeve and being shaped and dimensioned so that the interior of the sleeve matches and fits closely over the surrounded exteriors of the inserted members, means for holding said member ends in an aligned relation that permits those ends to be moved into abutment within the sleeve, an induction-heating coil removably encircling said sleeve in the lengthwise region where said member ends meet each other therewithin and adapted to create when energized a field of high frequency magnetic flux that passes through the sleeve material into the metal members surrounded thereby and that imparts inductive heating to the metal in the extreme ends of those members, and means for pressing said member ends together to effect contact and welding thereof due to melting and fusion of the metal in the portions of those ends that are inductively heated as aforesaid, said sleeve of frangible material serving as a mold to confine said melted and fused metal to the contour of the sleeve interior thereby assuring a weld juncture of diameter substantially no greater than that of the metal members united at the juncture, said sleeve further being arranged and organized for ready breaking of the frangible material thereof as by a hammer blow and removal of the sleeve from around the member ends after the aforesaid welding of those ends has been completed.

2. The apparatus of claim 1 when used to fusion weld the ends of copper cable such as the drawings hereof illustratively disclose at A and B.

3. The apparatus of claim 1 wherein said frangible material sleeve is provided at one side of the location therewithin where said metal members abut with an inlet for admitting protective gas and at the other side of said abutting location with an outlet for venting said gas from the sleeve after same has passed over and bathed the end metal of the aforesaid two members that face each other within the sleeve.

4. In the art of welding metals by an induction fusion technique wherein the metal parts to be joined are held in aligned and pressed-together relation and encircled by an inductor heating coil which when energized creates a field of high frequency alternating magnetic flux that imparts inductive heating to the abutting portions of those parts, the improvement which comprises surrounding said aligned and abutted parts by a sleeve of breakable material such as frangible ceramic interposed between said inductor coil and said parts and shaped to match and fit closely over the exterior contour of those parts in a way permitting insertion of the two parts into opposite ends of the sleeve and pressing thereof together within the sleeve, said sleeve of frangible material serving as a mold to confine to the contour of the sleeve interior the metal of said abutting parts that is melted and fused together by said inductive heating, said sleeve further being arranged and organized for ready breaking of the frangible material thereof as by a hammer blow and removal of the sleeve from around the member ends after the aforesaid welding of those ends has been completed.

References Cited in the file of this patent

UNITED STATES PATENTS

| | | |
|---|---|---|
| 402,107 | Ries | Apr. 23, 1889 |
| 1,215,966 | Murray | Feb. 13, 1917 |
| 2,437,127 | Richardson | Mar. 2, 1948 |
| 2,480,299 | Klinke | Aug 30, 1949 |
| 2,625,637 | Garner et al. | Jan. 13, 1953 |

FOREIGN PATENTS

| | | |
|---|---|---|
| 355,189 | Great Britain | Feb. 12, 1930 |